L. L. OIE.
DISTRIBUTING VALVE FOR ACETYLENE TANKS.
APPLICATION FILED SEPT. 9, 1912.
1,070,062.
Patented Aug. 12, 1913.
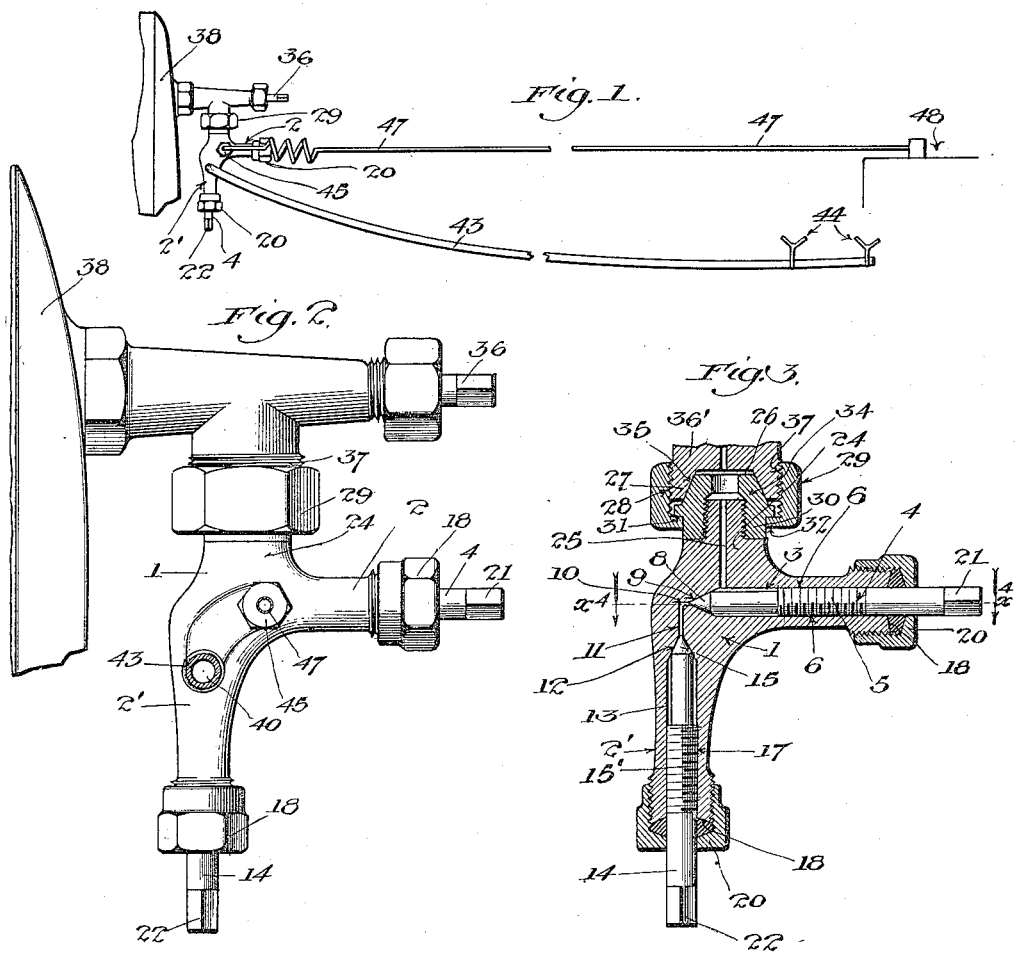
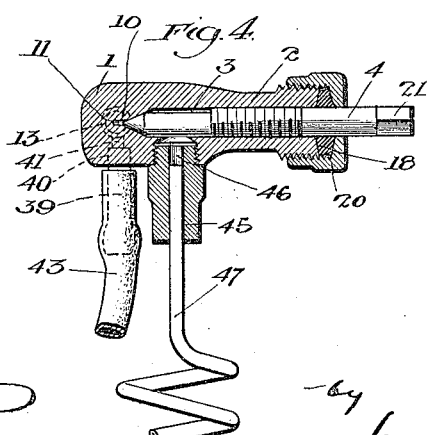
Inventor
Lars L. Oie,

UNITED STATES PATENT OFFICE.

LARS L. OIE, OF SAN PEDRO, CALIFORNIA.

DISTRIBUTING-VALVE FOR ACETYLENE-TANKS.

1,070,062.  Specification of Letters Patent.  Patented Aug. 12, 1913.

Application filed September 9, 1912. Serial No. 719,488.

*To all whom it may concern:*

Be it known that I, LARS L. OIE, a subject of the King of Norway, having declared my intention of becoming a citizen of the United States, residing at San Pedro, in the county of Los Angeles and State of California, have invented a new and useful Distributing - Valve for Acetylene - Tanks, of which the following is a specification.

This invention relates to means for distributing acetylene gas to the lamps of a power vehicle, and also to the engines thereof, and the main object of the invention is to provide means whereby the pressure of the supply of gas to the lamps may be readily regulated without interference with the supply of gas for starting the engines.

Another object of the invention is to provide means whereby the supply of gas for the lamps may be regulated by a permanent or set regulation independent of the shut-off valve, so that when the shut-off valve is opened, the rate of supply of gas to the lamps is determined by the regulating valve and said regulating valve does not have to be adjusted, each time the gas is turned onto the lamps.

Another object of the invention is to reduce to a minimum the number of connections or couplings required between the tank and the gas consuming device, thereby minimizing the leakage.

Other objects of the invention will appear hereinafter.

The accompanying drawings illustrate an embodiment of the invention, and referring thereto:

Figure 1 is a diagrammatic elevation, showing the application of the distributing means. Fig. 2 is a side elevation of the distributing valve. Fig. 3 is a vertical section thereof. Fig. 4 is a section on line $x^4$—$x^4$ in Fig. 2.

The valve comprises a casing 1, preferably L-shaped, having two arms or portions 2 and 2' which may be substantially at right angles to one another. The casing portion 1 is formed with an interior bore 3 to receive a valve stem 4, said valve stem having a screw threaded portion 5, screwing in a screw threaded portion 6 of said bore and the inner end of said valve stem being formed with a tapering or conical shaped valve plug member 8 coöperating with a conical valve seat 9. From the end of said conical valve seat, a reduced bore 10 extends inwardly to communicate with the inner end of a similar bore 11 which extends inwardly from a conical valve seat 12 formed at the inner end of a bore 13 in the other arm or portion 2' of the casing. A valve stem 14 extends in said bore 13 and is provided at its inner end with a taper or conical valve portion 15 coöperating with said seat, and is further provided with a screw threaded portion 15 engaging with a screw thread 17 in the bore 13. The outer ends of the bores 3 and 13 are formed with recesses or chamber 18 to receive packing material held in place by glands 20 forming stuffing boxes for the respective valve stems. The outer ends of the valve stems 4 and 14 are formed with squared portions 21 and 22 to receive wrenches for turning the valves to open or close the same. The base or central portion of the valve casing is formed with a boss 24 provided with a bore 25 communicating with the bore 3 aforesaid, and with a chamber or circular recess 26 surrounded by a circular flange 27, screw threaded as at 28 to receive a coupling ring 29 for a union member 30. Said union member is formed with a shoulder 31 adapted to coöperate with a flange 32 on said coupling ring and is formed with a tapering boss 34 adapted to coöperate with a tapering seat 35 in the casing 36' for the main valve of the acetylene tank 38, said main valve having a screw 37 to engage the coupling ring 29.

The lamp connection consists of a nipple 39, screwing into the valve body or casing and having a bore 40 communicating through a channel 41 in said valve body with the bore 13 for the valve stem 14, said valve stem being sufficiently smaller than the bore to enable passage of the gas around the valve stem to said nipple. Said nipple is adapted to receive the tube 43 leading to the lamps, indicated at 44.

The starter connection consists of a nipple or tube 45 screwing into the valve body 1 and having a bore 46 communicating with the bore 3. A pipe 47 leads from nipple 45 to the engine indicated at 48, to supply gas to the engine for starting the same.

The operation is as follows: When the main valve 36 of the acetylene tank 38 is opened, the gas flows to the channel or bore 3 of the valve casing 1 and the starter connection being in communication with this bore, the gas under the full pressure as controlled by opening the main valve 36 passes to the starting connection so that gas under full pressure is supplied for starting the engine. Assuming that the valve 4 is closed, no gas passes at this time to the lamps, but when the valve 4 is opened, gas passes from the bore 3 through the channels 10 and 11, to the valve 14, and said valve having been previously set to give the proper regulation, the gas flows past this valve into bore 13 and out through the lamp connections 39 and 43 to the lamps, the pressure supplied to the lamps being regulated by proper adjustment of the valve 14, and this valve being left in adjusted position when the shut-off valve 4 is closed, so that gas is supplied at the proper pressure for the lamps at every operation without having to make any special adjustment therefor.

By making the valve casing in one solid integral body, and making the connections for the lamps and starter to said body without the use of a union, I provide for the connection from the tank to the said devices by the use of a single union, thereby reducing to a minimum the leakage of gas. In devices of this kind, it is usual to use three or four unions in the connections, involving considerable leakage, as the unions are liable not to be gas tight. Only one union is necessary for uncoupling the tank for recharging, and my invention, therefore, reduces the number of unions as far as possible.

What I claim is:

1. A distributing valve for acetylene tanks, comprising a valve casing having an inlet opening for communicating with the outlet valve of the acetylene tank, a starter connection communicating with said inlet opening, a lamp supply connection, a regulating valve working in said casing and controlling communication from said inlet opening to said lamp supply connection, said valve being adjustable to regulate the pressure on the lamp supply connection, and a shut-off valve for shutting off communication from said opening to said regulating valve.

2. A distributing valve for acetylene tanks, comprising a valve casing formed as a solid integral body, having an inlet opening for communicating with the outlet valve of the acetylene tank, a starter connection communicating with said inlet opening, a lamp supply connection, a regulating valve working in said casing and controlling communication from said inlet opening to said lamp supply connection, said valve being adjustable to regulate the pressure on the lamp supply connection, and a shut-off valve for shutting off communication from said opening to said regulating valve, said starter and lamp connections being provided with screw means screwing directly into said body and the said inlet opening being provided with a union for connection to the valve of the acetylene tank.

In testimony whereof, I have hereunto set my hand at Los Angeles, California this 30th day of August, 1912.

LARS L. OIE.

In presence of—
ARTHUR P. KNIGHT,
F. A. CRANDALL.

---

Copies of this patent may be obtained for five cents each, by addressing the "Commissioner of Patents, Washington, D. C."